United States Patent
Tolonen et al.

(10) Patent No.: US 12,352,604 B2
(45) Date of Patent: Jul. 8, 2025

(54) SENSOR CALIBRATION ARRANGEMENT, DEVICE AND METHOD THEREOF

(71) Applicant: SENSIRE OY, Joensuu (FI)

(72) Inventors: Antti Tolonen, Joensuu (FI); Aki Hännikäinen, Joensuu (FI); Ossi Laakkonen, Joensuu (FI)

(73) Assignee: SENSIRE OY, Joensuu (FI)

( * ) Notice: Subject to any disclaimer, the term of this patent is extended or adjusted under 35 U.S.C. 154(b) by 652 days.

(21) Appl. No.: 17/780,005

(22) PCT Filed: Nov. 26, 2020

(86) PCT No.: PCT/FI2020/050798
§ 371 (c)(1),
(2) Date: May 25, 2022

(87) PCT Pub. No.: WO2021/105564
PCT Pub. Date: Jun. 3, 2021

(65) Prior Publication Data
US 2023/0023492 A1    Jan. 26, 2023

(30) Foreign Application Priority Data
Nov. 26, 2019   (FI) ..................... 20196014

(51) Int. Cl.
*G01D 18/00* (2006.01)
*G01D 21/00* (2006.01)
(Continued)

(52) U.S. Cl.
CPC ......... *G01D 18/001* (2021.05); *G01D 18/008* (2013.01); *G01D 21/00* (2013.01); *G01L 27/005* (2013.01); *H04W 4/029* (2018.02)

(58) Field of Classification Search
CPC .... G01D 18/001; G01D 18/008; G01D 21/00; G01D 18/00; G01D 18/002; G01L 27/005; H04W 4/029; H04Q 9/00; G01K 15/005
See application file for complete search history.

(56) References Cited

U.S. PATENT DOCUMENTS 6,775,632 B1 * 8/2004 Pollack ................. G01L 27/005
                                                            702/104
9,310,232 B2    4/2016 Heide et al.
(Continued)

FOREIGN PATENT DOCUMENTS

WO    2016/015154    2/2016

OTHER PUBLICATIONS

Maag, Balz, Zimu Zhou, and Lothar Thiele. "A survey on sensor calibration in air pollution monitoring deployments." IEEE Internet of Things Journal 5.6 (2018): 4857-4870. (Year: 2018).*
(Continued)

*Primary Examiner* — Sharad Rampuria
(74) *Attorney, Agent, or Firm* — NIXON & VANDERHYE

(57) ABSTRACT

An arrangement for sensor node calibration, including a calibration chamber including or being connected to a unit to facilitate control of at least one calibration quantity or attribute in the calibration chamber, a reference measuring unit arranged to measure at least one calibration quantity or attribute inside the calibration chamber, and a computing unit arranged to obtain from at least one sensor node sensor node identifier (ID) information, sensor node measurement information, wherein the computing unit is arranged to identify a sensor node based on sensor node ID information received from the sensor node, obtain measurement information the identified 0sensor node, obtain calibration quantity or attribute measurement in-formation from the refer-
(Continued)

Figure 1:
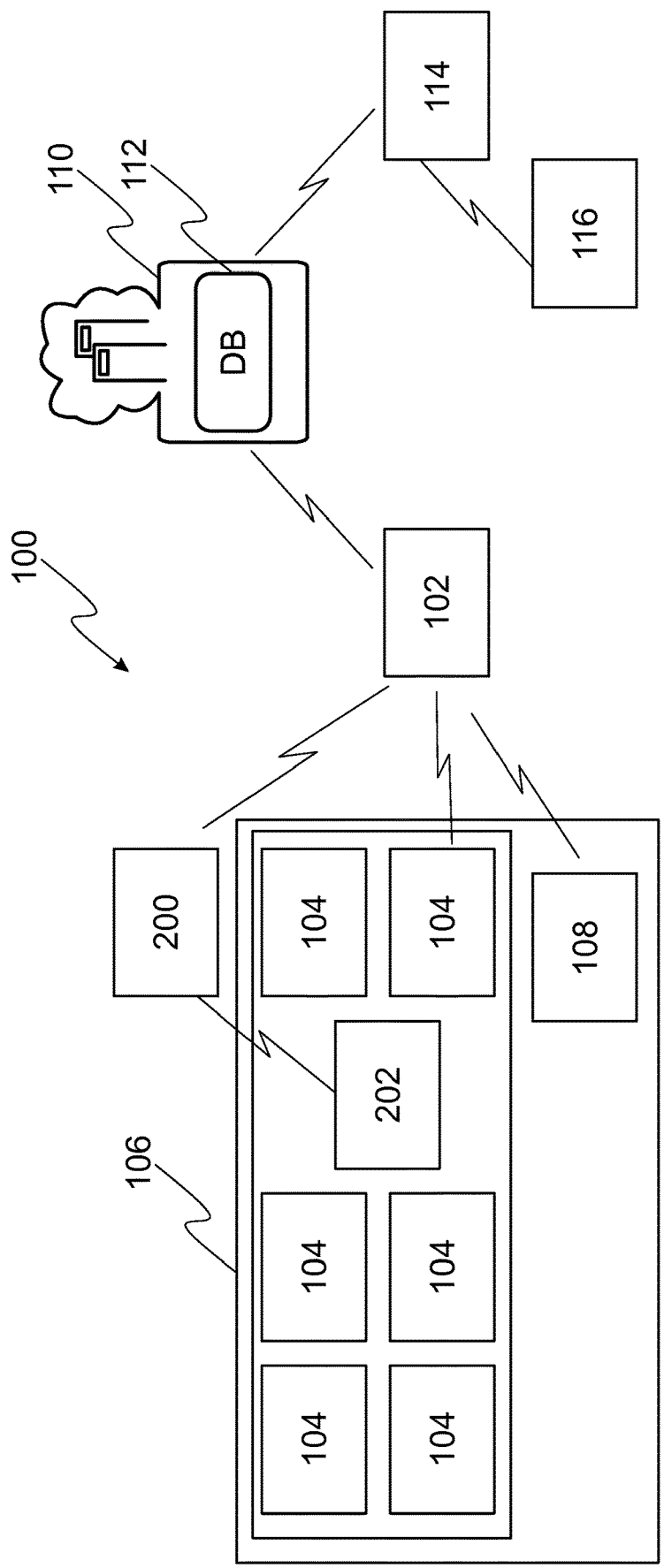

ence measuring unit, and compare calibration quantity or attribute measurement information with sensor node measurement information. Corresponding device and method are also disclosed.

22 Claims, 5 Drawing Sheets

(51) Int. Cl.
 *G01L 27/00* (2006.01)
 *H04W 4/029* (2018.01)

(56) References Cited

U.S. PATENT DOCUMENTS

2015/0127287 A1* 5/2015 Wolf ................... G01L 27/005
 702/98
2017/0286820 A1* 10/2017 Nikunen ............. H04W 88/027
2017/0372601 A1 12/2017 Yamashita et al.

OTHER PUBLICATIONS

International Search Report for PCT/FI2020/050798 dated Feb. 5, 2021, 4 pages.
Written Opinion of the ISA for PCT/FI2020/050798 dated Feb. 5, 2021, 7 pages.

\* cited by examiner

SENSOR CALIBRATION ARRANGEMENT, DEVICE AND METHOD THEREOF

This application is the U.S. national phase of International Application No. PCT/FI2020/050798 filed Nov. 26, 2020 which designated the U.S. and claims priority to FI 20196014 filed Nov. 26, 2019, the entire contents of each of which are hereby incorporated by reference.

FIELD OF THE INVENTION

Generally, the present invention relates to electronic devices and short-range sensor network arrangements. Particularly, however not exclusively, the invention pertains to a secure arrangement for sensor calibration.

BACKGROUND

Monitoring remotely cargo units is an essential part of modern tracking of intermodal transportation means. However, tracking sensor nodes need to be calibrated from time to time. Calibration of sensor nodes has common shortcomings of inaccuracy and risk of faulty calibration results caused by user error and tampering of results.

SUMMARY OF THE INVENTION

The objective of the embodiments of the present invention is to at least alleviate one or more of the aforementioned drawbacks evident in the prior art arrangements particularly in the context of sensor calibration arrangements. The objective is generally achieved with an arrangement, gateway device and method as disclosed and claimed.

An advantage of the present invention is that it allows for an automatic calibration process with little or no user intervention, which is beneficial for eliminating accidental and purposeful error and tampering from users. Further, the invention may be used to provide a secure way to perform wireless sensor calibration.

Another advantage of the present invention is that it allows for full automation of sensor node calibration process.

In accordance with one aspect of the present invention an arrangement for sensor node calibration, comprising
- a calibration chamber comprising or being connected to means to facilitate control of at least one calibration quantity or attribute in said calibration chamber,
- reference measuring means arranged to measure at least one calibration quantity or attribute inside the calibration chamber, and
- computing means arranged to obtain from at least one sensor node
  - sensor node identifier (ID) information,
  - sensor node measurement information,
- wherein the computing means is arranged to
  - identify a sensor node based on sensor node ID information received from the sensor node,
  - obtain measurement information from the identified sensor node,
  - obtain calibration quantity or attribute measurement information from the reference measuring means, and
  - compare said calibration quantity or attribute measurement information with said sensor node measurement information.

According to an exemplary embodiment of the present invention the computing means is further arranged to determine based on the comparison whether the calibration quantity or attribute measurement and sensor node measurement are essentially the same.

According to an exemplary embodiment of the present invention the computing means is further arranged to determine based on the comparison whether the calibration quantity or attribute measurement information and the sensor node measurement information correlate, and based on correlation, whether a sensor node measurement information measures the controlled calibration quantity or attribute in the calibration chamber.

According to an exemplary embodiment of the present invention the computing means is further arranged to determine based on the comparison whether the calibration quantity or attribute and sensor node measurement information correlate, and based on correlation, whether the sensor node is situated in the calibration chamber.

According to an exemplary embodiment of the present invention the computing means is arranged to facilitate control of the calibration quantity or attribute in the climate chamber by connecting with a controller of the climate chamber and facilitating control thereof.

According to an exemplary embodiment of the present invention the computing means is arranged to facilitate control of the calibration quantity or attribute in the calibration chamber via at least functional connection with a controller of the calibration chamber.

According to an exemplary embodiment of the present invention the reference measuring means is facilitated by the calibration chamber.

According to an exemplary embodiment of the present invention the reference measuring means comprises or is facilitated by a reference meter.

According to an exemplary embodiment of the present invention the sensor node is identified by comparing the sensor node identifier to a predetermined sensor node identifier dataset in the computing means or accessible by the computing means.

According to an exemplary embodiment of the present invention the computing means comprises or is facilitated by a gateway device.

According to an exemplary embodiment of the present invention the computing means is at least partly facilitated by an external server.

According to an exemplary embodiment of the present invention the sensor node identifier information and the sensor node measurement information are obtained from a plurality of sensor nodes.

According to an exemplary embodiment of the present invention the computing means is further arranged to obtain information of the measurement uncertainty of the arrangement.

In accordance with one aspect of the present invention a gateway device for a sensor node calibration arrangement, comprising
- means to obtain calibration quantity or attribute measurement information of a calibration chamber from reference measuring means,
- means to obtain from at least one sensor node
  - sensor node identifier (ID) information, and
  - sensor node measurement information,
- arranged to
  - compare the calibration quantity or attribute measurement information with the sensor node measurement information. 10

According to an exemplary embodiment of the present invention the gateway device is further arranged to compare the collected sensor node identifier information with a sensor node identifier dataset retrievable According to an exemplary embodiment of the present invention the gateway device is further arranged to facilitate wireless short-range communications to at least obtain information from the at least one sensor node and/or from the reference measuring means.

According to an exemplary embodiment of the present invention the gateway device is further arranged to connect with the calibration chamber to facilitate control of the calibration quantity or attribute thereat.

According to an exemplary embodiment of the present invention the gateway device is further arranged to facilitate control of the calibration quantity or attribute in accordance with a calibration profile or scheme.

According to an exemplary embodiment of the present invention the 30 gateway device is further arranged to obtain sensor node calibration adjustment information.

In accordance with one aspect of the present invention a method for sensor node calibration, comprising the steps of
 facilitating control of a calibration quantity or attribute in a calibration chamber,
 obtaining measurement information of the calibration quantity or attribute from reference measuring means,
 obtaining sensor node identifier information from a sensor node,
 obtaining sensor node measurement reading pertaining to the same characteristic as the calibration quantity or attribute from the sensor node,
 comparing sensor node measurement reading with the calibration quantity or attribute information, and
 determining if sensor node measurement reading correlates with or is the same as the calibration quantity or attribute information.

According to an exemplary embodiment of the present invention the method further comprises determining if the sensor node is situated in the calibration chamber by determining if said sensor node measurement reading correlates with or is the same as the calibration quantity or attribute information.

According to an exemplary embodiment of the present invention the method further comprises determining if the sensor node needs adjustment
 by determining if the sensor node measurement reading does not correlate with or is not the same as the calibration quantity or attribute information.

According to an exemplary embodiment of the present invention the method further comprises the sensor node needs adjustment by determining if the sensor node measurement reading doesn't correlate with or is not the same as the calibration quantity or attribute information after adjustment.

In accordance with one aspect of the present invention a computer pro-3
 0 gram product embodied in a non-transitory computer readable medium, comprising computer code for causing the computer to execute the method in accordance with the present invention.

As briefly reviewed hereinbefore, the utility of the different aspects of the present invention arises from a plurality of issues depending on each particular embodiment.

The expression "a number of" may herein refer to any positive integer starting from one (1). The expression "a plurality of" may refer to any positive integer starting from two (2), respectively.

The term "exemplary" refers herein to an example or example-like feature, not the sole or only preferable option.

The expression "calibration quantity or attribute measurement information" refers to information of a quantity or attribute which is being calibrated and which a sensor can measure.

Different embodiments of the present invention are also disclosed.

BRIEF DESCRIPTION OF THE RELATED DRAWINGS

Figure 2:
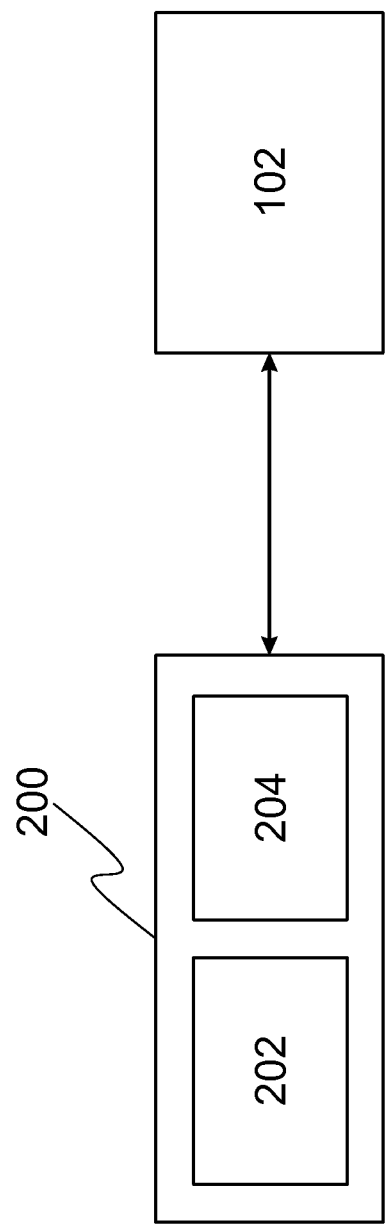
Figure 3A:
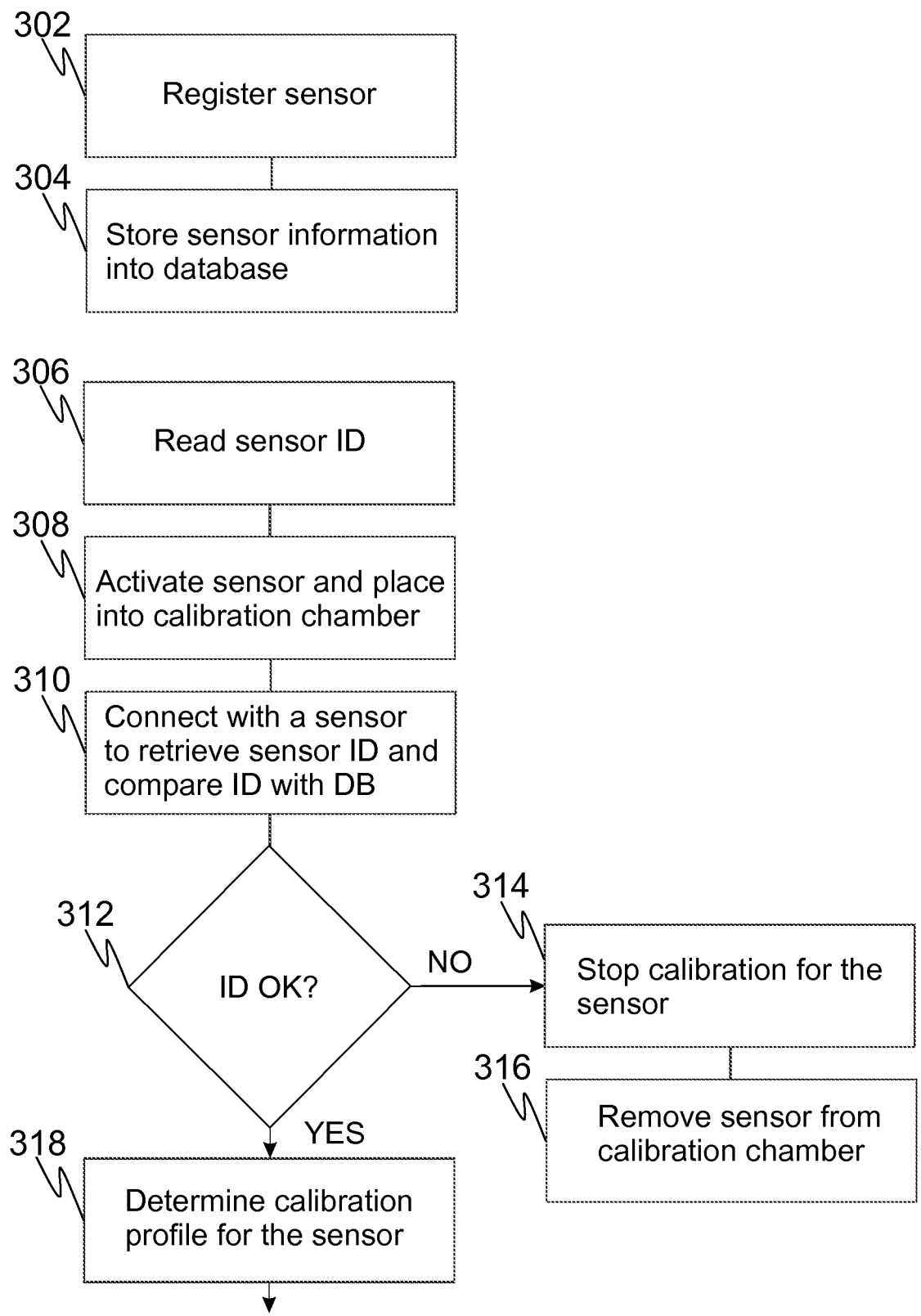
Figure 3B:
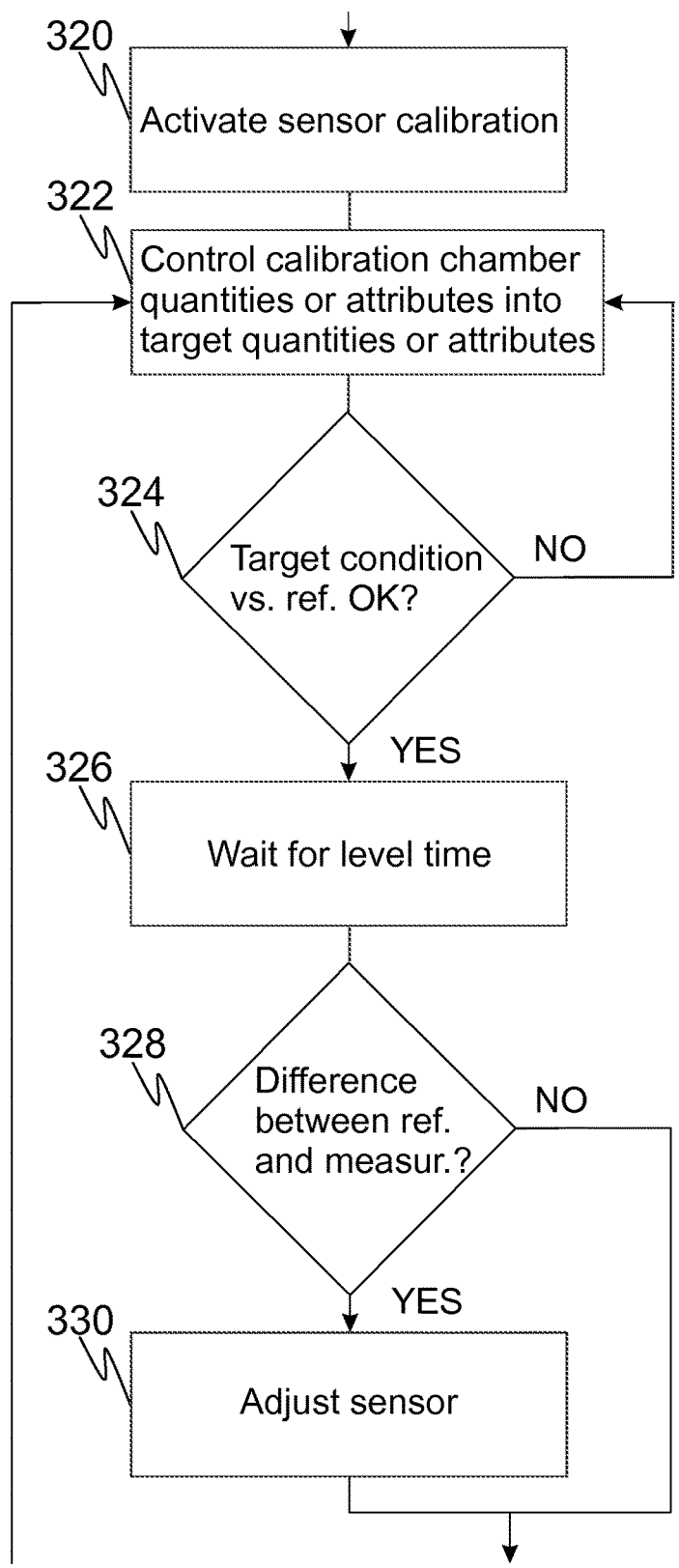
Figure 3C:
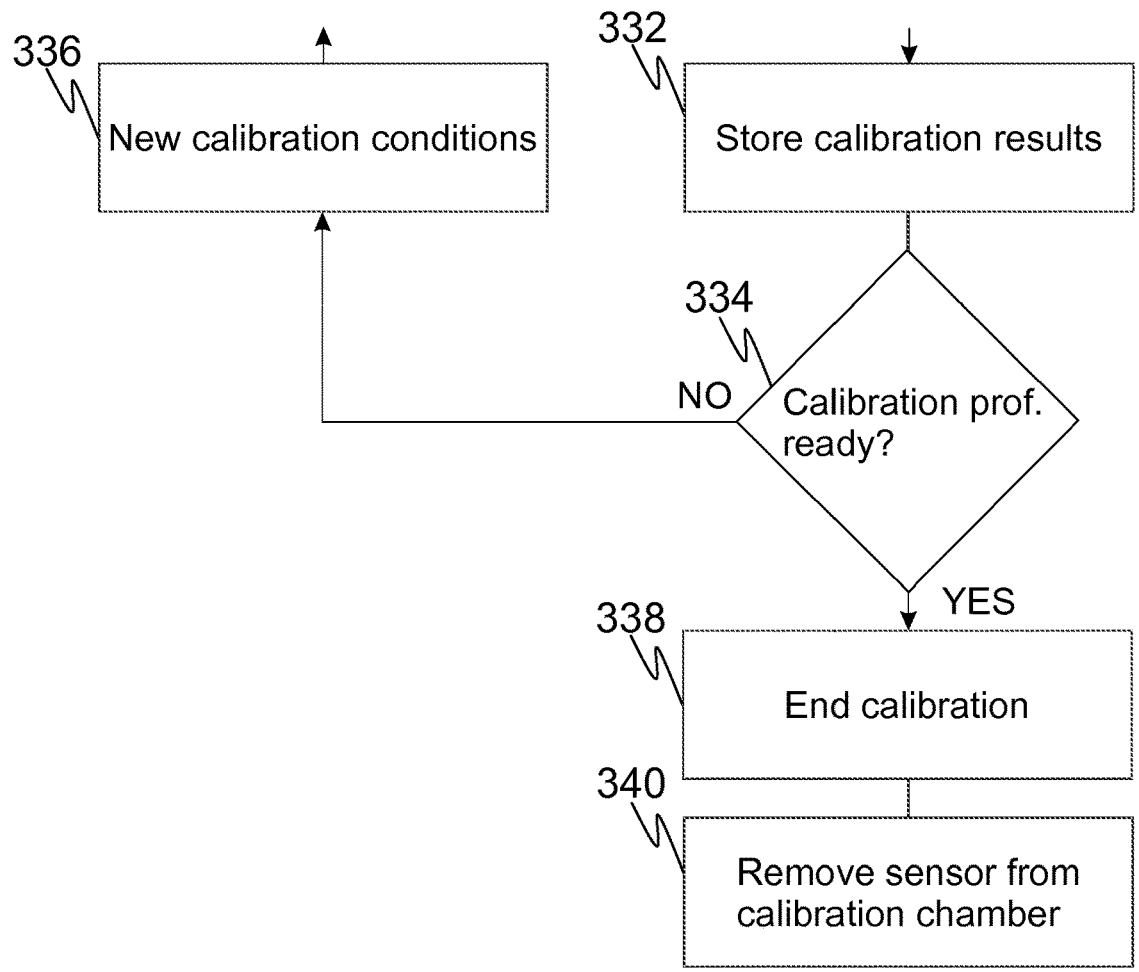

Next, some exemplary embodiments of the present invention are reviewed more closely with reference to the attached drawings, wherein FIG. 1 illustrates an arrangement and some associated aspects thereof in accordance with an embodiment of the present invention, FIG. 2 illustrates a block diagram of the reference meter device in accordance with an embodiment of the present invention, FIGS. 3a, 3b, 3c illustrate a continuous flow chart of a method in accordance with an embodiment of the present invention.

DETAILED DESCRIPTION OF THE EMBODIMENTS

FIG. 1 illustrates an arrangement (100) and some associated aspects thereof in accordance with an embodiment of the present invention.

The arrangement (100) comprises a gateway device (102), reference meter device (200) as reference measuring means, a calibration chamber (106) and tracking sensor nodes (104). The tracking sensor nodes (104) are placed in the calibration chamber (106) for calibration. The gateway de-vice (102) is arranged to connect with the reference meter device (200) with a wired connection or wirelessly, calibration chamber controller (108) and tracking sensor nodes (104). This way tracking sensor nodes (104) may be placed into the calibration chamber for calibration and automatically be connected wirelessly to receive tracking sensor node ID information and sensor measurement data. Further, the gateway device (102) is arranged to send commands to the calibration chamber controller (108) to facilitate control of climate or such calibration quantities or attributes in the calibration chamber (106) in accordance with a calibration profile(s) or scheme for calibrating the tracking sensor nodes (104). Reference meter device (200) is used to measure a number of quantities or attributes in the calibration chamber (106) for providing a reference for comparison with tracking sensor measurement readings of the same quantities or attributes. Gateway device (102) is arranged to receive reference measurement values from the reference meter device (200) and the gateway device (102) is also arranged to connect with the calibration chamber controller (108).

The gateway device (102) is arranged to control the calibration process and to store calibration process information, such as a number of calibration profiles, tracking sensor node (104) ID information, process of the calibration and measurement information from the tracking sensor nodes (104) and reference meter device (200), as well as control information for facilitating commands to the calibration chamber controller (108) and controlling the calibration chamber (106), and/or information of the measurement uncertainty of the arrangement, which may be defined as input by a supervisor or an administrator overseeing the calibration. This way the gateway device (102) may control the calibration process autonomously and maintain control and store information even if connection is lost for a period of time to one or more of the tracking sensor nodes (104), reference meter device (200), calibration chamber controller (108) and/or external server (110).

The gateway device (102) may be further arranged to obtain information of the measurement uncertainty of the arrangement (100). Such measurement uncertainty of the arrangement (100) may be determined such that the uncertainty includes the sum of measurement uncertainty of the calibration chamber (106) and the measurement uncertainty of the reference meter device (200). The measurement uncertainty of the arrangement (100) may be determined by an operator who stores the measurement uncertainty information to the gateway device (102) or other source, such as the cloud service (110), wherefrom it may be obtained by the gateway device (102). Further, gateway device (102) may be further arranged to obtain sensor calibration adjustment information. Sensor calibration adjustment information may include information of the previous adjustments made to the sensor in a previous calibration process. Sensor calibration adjustment information may be obtained from a report comprising sensor accuracy before and after adjustment, and also comprising prior adjustment values and current adjustment values.

The reference meter (200) may be provided as a stand-alone device with a digital communication interface (204) and a sensor (202) insertable in the calibration chamber (106) to measure a number of quantities or attributes in the calibration chamber (106). Optionally, the reference meter (200) may be integrated with the calibration chamber (106).

The gateway device (102) preferably comprises at least a RF-interface with at least wireless short-range transmission and receiving means, such as IEEE 802.11, IEEE 802.15.1 and/or such ISM/SRD band communication means or wired communication means for connecting with the tracking sensor nodes (104), the reference meter (200) and the calibration chamber (106). The gateway device (102) also comprises long-range wireless communication means, such as NB-IoT, LTE Cat-M1 and 2G/3G/4G/5G communication means, or wired communication means, such as an Ethernet connection, for communicating with an external server (110), such as a cloud service, or other preferred server arrangement. The gateway device (102) is preferably arranged to establish an encrypted connection between the gateway device (102) and the external server (110). Communication between the gateway device (102) and other nodes, such as the tracking sensor nodes, is also preferably encrypted.

The external server (110) comprises at least information pertaining to tracking sensor nodes (104). Tracking sensor nodes (104) may be registered to the system e.g. by utilizing a barcode reader (116) at and connected to a terminal (114), such as a mobile device, personal computer, or the like.

The gateway device (102) may comprise also other typical operational components or circuits such as a memory for storing measurement information received from the tracking sensor nodes (104) and information pertaining to sensor identification. Processing of information may be done at least partly on the gateway device or essentially completely at the cloud depending i.a. on the gateway device design.

A tracking sensor node (104) may comprise at least an RF transmitter, receiver and/or transceiver arranged to communicate with the gateway de-vice (102) via short-range communications means. The RF transmitter, receiver and/or transceiver may comprise one or more circuits and components pertaining to RFID, NFC, IEEE 802.11 a/b/g/n, IEEE 802.15.1, IEEE 802.15.4 and/or such ISM/SRD band communication techniques. The tracking sensor nodes (104) preferably also comprise readable unique ID information.

A tracking sensor node (104) may comprise active sensing means for measuring a number of quantities or attributes. Such sensing means may i.a. encompass temperature sensors, humidity sensors, magnetic sensors, accelerometers, pressure sensors and gyroscope. The tracking sensor nodes (104) are preferably arranged to send at least measurement values and/or metadata pertaining to measurements or the node functioning, wirelessly to the gateway device (102).

The tracking sensor nodes (104) may be e.g. wireless or wired sensor nodes used in logistics systems used to track characteristics inside containers, characteristic controlled spaces and parcels moved via myriad of transporting means, such as by plane, shipping and vehicles. The arrangement (100) may further comprise or be connected to a cloud service (110) or such one or more external servers. The cloud service (110) may comprise a database (112) comprising ID information of the tracking sensor nodes (104) collected by or at a terminal (114) connected with a barcode reader (116) or such device capable of detecting tracking sensor node (104) ID information. The cloud service (110) may be used to determine if sensor measurement reading and calibration quantity or attribute information correlate or this determination may be done partly or wholly on the gateway device (102). The gateway device may be arranged to compare collected sensor ID information with a sensor ID dataset retrievable from the database (112).

The calibration chamber (106) may comprise e.g. environmental chamber, climate chamber, liquid chamber, pressure chamber, or any such chamber for facilitating a number of calibration quantities or attributes inside the calibration chamber (106). The quantities or attributes facilitated in the calibration chamber (106) for tracking sensor node (104) calibration, i.e. the calibration quantities or attributes, may comprise including but not limited to light, motion, temperature, magnetic fields, gravity, humidity, moisture, vibration, pressure, electrical fields, sound, elevation, inclination, other physical and Chemical aspects, and the like, whether ambient, external or internal to the sensor. The quantity or attribute being calibrated in the calibration chamber (106) and being measured by at least the reference meter device (200) is a calibration quantity or attribute wherefrom measurement information may be produced by the reference meter device (200) and the tracking sensor nodes (104) if said tracking sensor nodes (104) are able to measure said calibration quantity or attribute.

FIG. 2 illustrates a block diagram of the reference meter device (200) in accordance with an embodiment of the present invention.

The reference meter device (200) facilitates reference measuring means and comprises at least a sensor (202) for capturing data from the sensor environment, position or movement thereof or by the sensor. The sensor (202) may be a probe head attached to a separate part of the reference meter device comprising also a controller.

The sensor (202) may comprise means for detecting temperature, magnetism, velocity, acceleration, pressure and orientation and changes there-of as well as such known ambient and/or internal sensory information. Further, the sensor comprises analog-to-digital converter for digitizing the analog signal created by the sensor of the sensed characteristic.

The reference meter device (200) further comprises a digital communication interface (204) for performing transceiver functions to communicate with a gateway (102). The digital communication interface (204) may comprise wireless, such as short-range wireless communications means, and/or wired communication means, such as USB, I2C, SPI, DART, RS232, RS485, and communication means of the like. The digital communication interface (204) is used to transmit digital sensing data to the gateway (102) automatically e.g. in preferred intervals or by request from the gateway (102).

The reference meter device (200) preferably comprises a unique identifier 5 pertaining to the reference meter device (200) stored on and retrievable from a memory of the reference meter device (200).

The reference meter device (200) preferably comprises means to calibrate the one or more sensors (202) or the reference meter device (200).

FIGS. 3*a*, 3*b*, 3*c* illustrate a continuous flow chart of a method in accordance with an embodiment of the present invention.

At, 302 a tracking sensor node is registered e.g. by recognition of the tracking sensor node ID information. Tracking sensor node ID information may be recognized by reading tracking sensor node ID information via short-range communication means, such as reading a barcode and/or a tag associated with the tracking sensor node and/or by retrieving ID information, such as tracking sensor node unique serial code information, from the tracking sensor node memory.

At 304, a registered tracking sensor node ID information is stored into database wherefrom sensor ID information may be retrieved.

Steps 302 and 304 may be done before a calibration process, such as when the tracking sensor node is taken into use, or when the calibration process for a tracking sensor node is executed.

At 306, a tracking sensor node to be calibrated is recognized by retrieving or reading its ID information.

At 308, the recognized tracking sensor node is activated and placed into a calibration chamber.

At 310, a connection is made between the tracking sensor node and a gateway to retrieve sensor ID and compare said ID with tracking sensor node ID information on a database.

At 312, a determination whether the retrieved sensor ID corresponds with tracking sensor node ID information registered into the database is made. If the tracking sensor node ID information doesn't correspond with any tracking sensor node ID information registered into the database, the step 314 is taken and the calibration for the tracking sensor node is stopped and at 316 the tracking sensor node is removed from the calibration chamber.

At 318, if the tracking sensor node ID information corresponds with tracking sensor node ID information registered into the database the calibration for the tracking sensor node is continued by determining a calibration profile for the tracking sensor node. The calibration profile is determined in accordance with the recognized tracking sensor type.

Such calibration profile may comprise automatic determination of one or more calibration quantities or attributes, such as temperature or other such quantity or attribute reading limits, amount of calibration points, response time, allowable offset, allowable hysteresis and/or other calibration quantity or attribute limits.

At 320, sensor calibration is activated by activating and selecting a calibration program for the calibration chamber.

At 322, the gateway controls the calibration chamber in accordance with the calibration profile.

At 324, the gateway connects with a reference meter device wherein the reference meter device is arranged to track calibration quantities or attributes in the calibration chamber. Calibration quantity or attribute information is retrieved from the reference meter device which is compared with the calibration quantity or attribute targets of the calibration profile. If the readings at the reference meter device deviate from the calibration quantity or attribute targets of the calibration profile, step 324 is taken and the calibration chamber is controlled to arrive at the calibration quantity or attribute targets.

At 326, a preferred time is waited at a target calibration quantity or attribute to let the tracking sensor set to a reading.

At 328, the tracking sensor measurement and reference meter device reading are compared. A big difference between the readings may be used to determine that the tracking sensor node is faulty or not placed in the calibration chamber. If none or acceptable difference between the readings is detected the calibration process continues directly to step 332.

At 330, the tracking sensor node is adjusted in view of the reference meter device reading and calibration profile for the tracking sensor node.

At 332, the calibration results are stored at the gateway or to an external server.

At 334, the calibration profile either dictates that the calibration should be continued or ended. If the calibration profile is not ready, another calibration quantity or attribute target is chosen at 336, and the calibration chamber is controlled to arrive at that calibration quantity or attribute target at 324. If the calibration profile is ready the calibration is ended at 338. A calibration report pertaining to i.a. the calibration results may be also produced and provided.

At 340, the tracking sensor node is removed from the calibration chamber after ending the calibration for tracking sensor node(s).

The method steps may be executable by a computer program product embodied in a non-transitory computer readable medium stored in a computing device, such as the gateway device (102).

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention.

The invention claimed is:

1. An arrangement for sensor node calibration, comprising
a calibration chamber comprising or being connected to a controller configured to facilitate control of at least one calibration quantity or attribute in said calibration chamber,
a reference meter arranged to measure at least one calibration quantity or attribute inside the calibration chamber, and
a gateway device arranged to obtain from at least one sensor node
sensor node identifier (ID) information,
sensor node measurement information, wherein the gateway device is arranged to
identify a sensor node based on sensor node ID information received from the sensor node,
obtain measurement information from the identified sensor node,
obtain calibration quantity or attribute measurement information from the reference meter, and compare said calibration quantity or attribute measurement information with said sensor node measurement information,
wherein the gateway device is further arranged to determine based on the comparison whether the calibration quantity or attribute measurement information and
the sensor node measurement information correlate, and
based on correlation, whether a sensor node measurement information measures the controlled calibration quantity or attribute in the calibration chamber.

2. The arrangement of claim 1, wherein the gateway device is further arranged to determine based on the comparison whether the calibration quantity or attribute measurement and sensor node measurement are essentially the same.

3. The arrangement of claim 1, wherein the gateway device is further arranged to determine based on the comparison whether the calibration quantity or attribute and sensor node measurement information correlate, and based on correlation, whether the sensor node is situated in the calibration chamber.

4. The arrangement of claim 1, wherein the gateway device is arranged to facilitate control of the calibration quantity or attribute in the calibration chamber via at least functional connection with a controller of the calibration chamber.

5. The arrangement of claim 1, wherein the reference meter is facilitated by the calibration chamber.

6. The arrangement of claim 1, wherein the reference meter comprises or is facilitated by a reference meter.

7. The arrangement of claim 1, wherein the sensor node is identified by comparing the sensor node identifier to a predetermined sensor node identifier dataset in the gateway device or accessible by the gateway device.

8. The arrangement of claim 1, wherein the gateway device comprises or is facilitated by a gateway device.

9. The arrangement of claim 1, wherein the gateway device is at least partly facilitated by an external server.

10. The arrangement of claim 1, wherein the gateway device is further arranged to obtain information of the measurement uncertainty of the arrangement.

11. The arrangement of claim 1, wherein sensor node identifier information and the sensor node measurement information are obtained froma plurality of sensor nodes.

12. A gateway device for a sensor node calibration arrangement, comprising
means to obtain calibration quantity or attribute measurement information of a calibration chamber from a reference meter,
means to obtain from at least one sensor node)
sensor node identifier (ID) information, and
sensor node measurement information,
arranged to
compare the calibration quantity or attribute measurement information with the sensor node measurement information, and
determine based on the comparison whether the calibration quantity or attribute measurement information and
the sensor node measurement information correlate, and
based on correlation, whether a sensor node measurement information measures the controlled calibration quantity or attribute in the calibration chamber.

13. The gateway device of claim 12 wherein the gateway device is further arranged to compare the collected sensor node identifier information with a sensor node identifier dataset retrievable from an external database.

14. The gateway device of claim 12 arranged to facilitate wireless short-range communications to at least obtain information from the at least one sensor node and/or from the reference meter.

15. The gateway device of claim 12 arranged to connect with the calibration chamber to facilitate control of the calibration quantity or attribute thereat.

16. The gateway device of claim 15 arranged to facilitate control of the calibration quantity or attribute in accordance with a calibration profile or scheme.

17. The gateway device of claim 12 arranged to obtain sensor node calibration adjustment information.

18. A method for sensor node calibration, comprising the steps of
facilitating control of a calibration quantity or attribute in a calibration chamber,
obtaining measurement information of the calibration quantity or attribute from reference meter,
obtaining sensor node identifier information from a sensor node,
obtaining sensor node measurement reading pertaining to the same characteristic as the calibration quantity or attribute from the sensor node,
comparing sensor node measurement reading with the calibration quantity or attribute information, and
determining based on the comparison whether the calibration quantity or attribute and
the sensor node identifier information correlate, and
based on correlation, whether a sensor node measurement information measures the controlled calibration quantity or attribute in the calibration chamber.

19. The method of claim 18 wherein determining if the sensor node is situated in the calibration chamber by determining if said sensor node measurement reading correlates with or is the same as the calibration quantity or attribute information.

20. The method of claim 18, wherein determining if the sensor node needs adjustment by determining if the sensor node measurement reading does not correlate with or is not the same as the calibration quantity or attribute information.

21. The method of claim 20 wherein determining if the sensor node needs adjustment by determining if the sensor node measurement reading doesn't correlate with or is not the same as the calibration quantity or attribute information after adjustment.

22. A non-transitory computer readable medium, comprising computer code that, when executed by a computer, causes the computer to execute the method of claim 18.

* * * * *